United States Patent
Nasri et al.

(10) Patent No.: US 11,933,905 B2
(45) Date of Patent: Mar. 19, 2024

(54) CONTROL SYSTEM AND METHOD FOR DETERMINING VEHICLE SYSTEM POSITION

(71) Applicant: Transportation IP Holdings, LLC, Norwalk, CT (US)

(72) Inventors: Mohamed Nasri, Oakbank (CA); Earle Edie, Oakbank (CA); Mark Kraeling, Melbourne, FL (US); Tyler Listoe, Oakbank (CA); Brett Trombo, Oakbank (CA); Tom Cwikla, Oakbank (CA)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 18/301,770

(22) Filed: Apr. 17, 2023

(65) Prior Publication Data
US 2023/0350079 A1      Nov. 2, 2023

Related U.S. Application Data

(60) Provisional application No. 63/363,689, filed on Apr. 27, 2022.

(51) Int. Cl.
*G01S 19/39*      (2010.01)
*B61L 27/04*     (2006.01)

(52) U.S. Cl.
CPC ............ *G01S 19/396* (2019.08); *B61L 27/04* (2013.01); *G01S 19/393* (2019.08); *B61L 2205/04* (2013.01)

(58) Field of Classification Search
CPC ...... G01S 19/396; G01S 19/393; G01S 19/49; B61L 27/04; B61L 2205/04
See application file for complete search history.

(56) References Cited

U.S. PATENT DOCUMENTS

| | | |
|---|---|---|
| 7,289,906 B2 | 10/2007 | van der Merwe et al. |
| 8,447,517 B2 | 5/2013 | Roh et al. |
| 8,862,394 B2 | 10/2014 | Taylor, Jr. et al. |
| 10,670,734 B2 | 6/2020 | Glocker et al. |
| 10,852,141 B2 * | 12/2020 | Cordova ............... H04W 4/029 |
| 2018/0286258 A1 * | 10/2018 | Derbanne ............... G01S 19/15 |
| 2023/0053704 A1 * | 2/2023 | Denny ................... G08G 1/097 |
| 2023/0188975 A1 * | 6/2023 | Newman ............. G08G 1/0145 455/456.1 |

* cited by examiner

*Primary Examiner* — Xiao En Mo
(74) *Attorney, Agent, or Firm* — The Small Patent Law Group LLC; Josef L. Hoffmann

(57) ABSTRACT

A method is provided that may include receiving a global navigation satellite system (GNSS) signal for a moving vehicle and obtaining a position estimation of the vehicle by inputting values of observable characteristics into an artificial intelligence (AI)-based model and receiving the position estimation as an output from the AI-based model. The AI-based model applies different coefficients to the values of the observable characteristics to output the position estimation. The method may also include calculating an error between a location derived from the GNSS signal that may be received and the position estimation obtained from the AI-based model, and changing one or more of the coefficients applied to the observable characteristics in the AI-based model based on the error that is calculated.

20 Claims, 4 Drawing Sheets

CONTROL SYSTEM AND METHOD FOR DETERMINING VEHICLE SYSTEM POSITION

CROSS-REFERENCE TO RELATED APPLICATIONS

This application claims priority to U.S. Provisional Patent Application No. 63/363,689, which was filed on 27 Apr. 2022, and the entire disclosure of which is incorporated herein by reference.

BACKGROUND

Technical Field

The subject matter described relates to a system and method for accurately determining the location of a vehicle system.

Discussion of Art

Vehicle systems such as rail vehicles may travel great distances along a route. As a result, control systems have been developed to assist operators of these vehicle system to increase efficiency as the vehicle system travels along a route. For example, when a vehicle system is going down a decline, around a curve, etc., control systems may assist an operator by automatically reducing throttle so that a braking system does not have to be applied that can reduce efficiencies.

Often these control systems are dependent on determining the exact location of the vehicle system on a route at any given time. When the position of the vehicle system is inaccurately determined, the control systems can be counterproductive, inefficient, and cause annoyance to an operator. For example, if a vehicle system is heading up an incline and according to the positioning detected by the control system the vehicle system is already at an upcoming decline, the control system may decrease the throttle while the vehicle system needs to be increasing the throttle to make it up the incline. In another example, when an automated vehicle system, such as a rail vehicle system needs to switch routes, if the position of the vehicle system cannot be accurately determined by the automated system, the vehicle system can miss such switch points.

Thus, problems occur for the operation of these vehicle systems when the control systems cannot determine an accurate position of the vehicle system. Factors resulting in inaccurate position determinations can include loss of location signal, such as when the vehicle system travels through a tunnel, or in a remote location, inaccurate calculations as a result of not providing the correct weight to different variables utilized to determine a location, inaccurate measuring of variables, or the like. Thus, it may be desirable to have a control system for a vehicle system that can accurately determine the position of the vehicle system under any condition.

BRIEF DESCRIPTION

In one or more embodiments, a method is provided that may include receiving a global navigation satellite system (GNSS) signal for a moving vehicle and obtaining a position estimation of the vehicle by inputting values of observable characteristics into an artificial intelligence (AI)-based model and receiving the position estimation as an output from the AI-based model. The AI-based model applies different coefficients to the values of the observable characteristics to output the position estimation. The method may also include calculating an error between a location derived from the GNSS signal that may be received and the position estimation obtained from the AI-based model, and changing one or more of the coefficients applied to the observable characteristics in the AI-based model based on the error that is calculated.

In one or more embodiments, a system may be provided that includes a controller that may receive GNSS signal for a moving vehicle. The controller may determine a position estimation of the vehicle by inputting values of observable characteristics into an AI-based model and receiving the position estimation as an output from the AI-based model. The AI-based model may apply different coefficients to the values of the observable characteristics to output the position estimation. The controller may also calculate an error between a location derived from the GNSS signal that is received and the position estimation obtained from the AI-based model, and to change one or more of the coefficients applied to the observable characteristics in the AI-based model based on the error that is calculated.

In one or more embodiments, a method is provided that may include receiving a GNSS signal for a moving vehicle and obtaining a position estimation of the vehicle by inputting values of observable characteristics into an artificial intelligence (AI)-based model and receiving the position estimation as an output from the AI-based model. The AI-based model can apply different coefficients to the values of the observable characteristics to output the position estimation. The method may also include calculating an error between a location derived from the GNSS signal that is received and the position estimation obtained from the AI-based model, and calculating an uncertainty in the location derived from the GNSS signal based on the error that is calculated. The method may also include calculating one or more changes to the one or more of the coefficients applied to the observable characteristics in the AI-based model by inputting the uncertainty in the location to an unscented Kalman filter.

BRIEF DESCRIPTION OF THE DRAWINGS

The inventive subject matter may be understood from reading the following description of non-limiting embodiments, with reference to the attached drawings, wherein below.

DETAILED DESCRIPTION

Provided is a control system that may utilize an AI-based model to determine the location of a vehicle system based on a GNSS signal. In one example, machine learning, an unscented Kalman filter, and/or a fuzzy inference system can be utilized for identification of uncertainties in an estimation of the position. The unscented Kalman filter may be based on a first-order Taylor expansion to approximate the measurement and process models. Consequently, the control system can use an unscented Kalman filter based on a fixed number of points to represent a Gaussian distribution locations to avoid the location estimation process diverging as a result of build-up errors. Accuracy in determining locations may be improved by introducing the AI-based model for the estimation of the position based on the GNSS signal. The AI-based model may rely on an adaptive neural network that may be continuously provided with route database information, environmental data, wheel data, or the like, to determine the location estimation. The estimations coming from the AI-based model are then utilized to calculate an error with respect to the location data from the GNSS signal. The error may then be used to determine the relative uncertainty of the GNSS signal using the fuzzy inference system. Then based on the uncertainty, coefficients are determined that are associated with the route database information, environmental data, wheel data, and the like that are utilized in making the estimation such that the next position determination can be more accurate.

Figure 1:
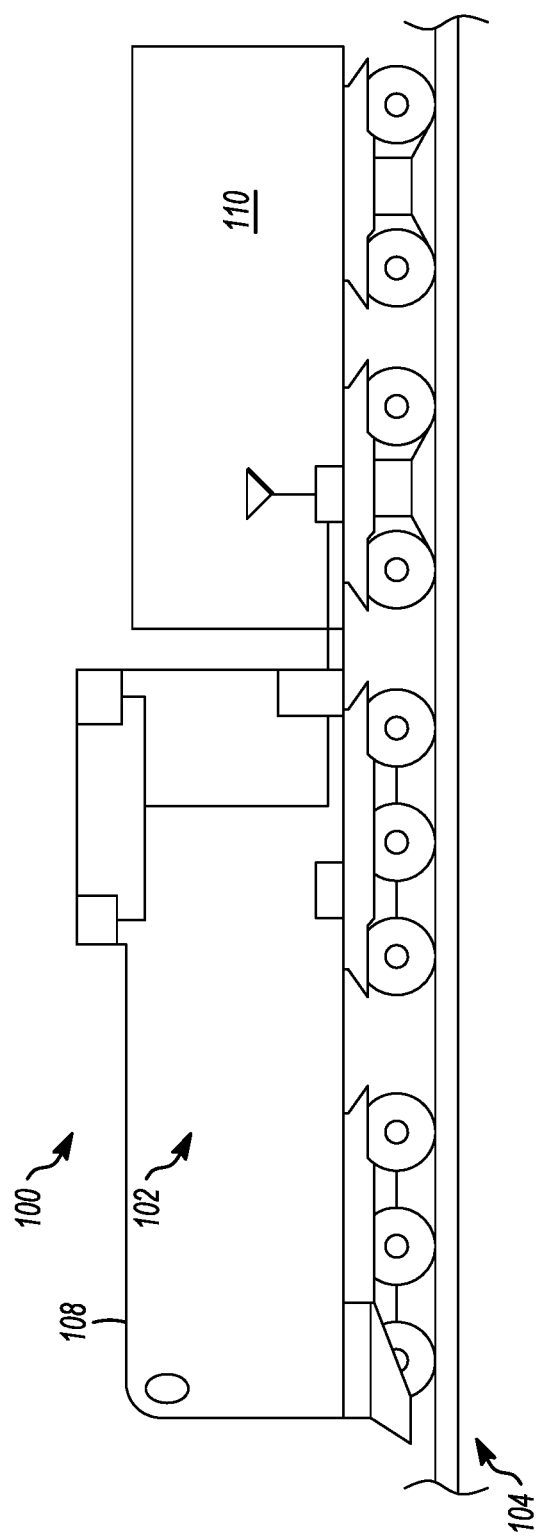
FIG. 1 illustrates block schematic diagram of a vehicle system.

FIG. 1 illustrates a schematic diagram of one example of a vehicle system 100 in accordance with an embodiment of the invention. FIG. 1 shows a vehicle system that is a rail vehicle. In other embodiments, a suitable vehicle system can be an off road vehicle, an automobile, a construction vehicle, an agricultural vehicle, a mining vehicle, marine vessel, an off-highway vehicle, or the like. The vehicle system may include a single vehicle or may include two or more vehicles. The vehicle system may travel along a route 104 on a trip from a starting or departure location to a destination or arrival location. In the illustrated example, the vehicle system may include a propulsion-generating vehicle 108 and a non-propulsion-generating vehicle 110. Yet in other examples, only a propulsion-generating vehicle 108, or propulsion-generating vehicles are provided. In the propulsion-generating vehicle 108 and non-propulsion-generating vehicle 110 example, vehicles may be mechanically interconnected to one another to travel together along the route. In another embodiment, the vehicles in the vehicle system may be logically or virtually coupled together, but not mechanically coupled together. For example, the vehicles may communicate with each other to coordinate their movements so that the vehicles move together as a convoy, platoon, swarm, fleet or consist without the vehicles being mechanically coupled with each other by couplers.

Figure 2:
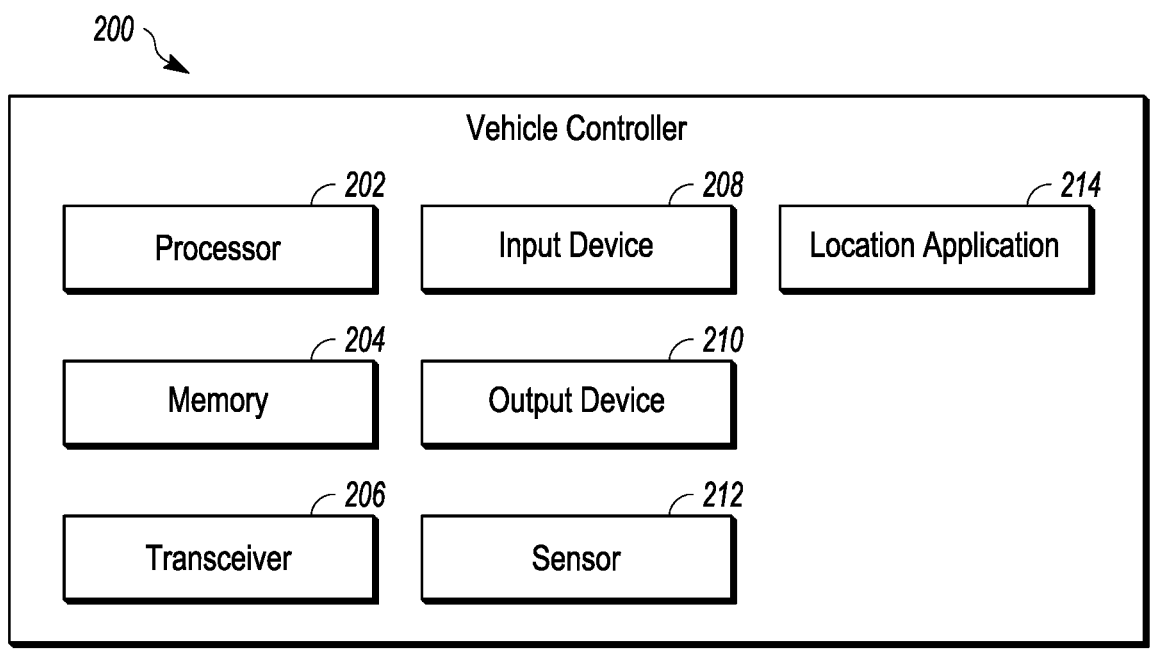
FIG. 2 illustrates a block schematic diagram of a control system.

FIG. 2 provides a schematic illustration of a control system 200 that may control operation of the propulsion-generating vehicle. In one example, the control system represents the control system in FIG. 1. The control system may be a device that includes one or more processors 202 (microprocessors, integrated circuits, field programmable gate arrays, etc.) that perform the operations of the control system, as described herein.

The control system optionally may include a tangible and non-transitory computer readable memory 204, which may be an electronic, computer-readable storage device or medium. The memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. The memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The control system may include a transceiver 206. The transceiver may be a single unit or be a separate receiver and transmitter. In one example, the transceiver may only transmit signals. In another example, the transceiver may obtain data from remote devices. In an example, the transceiver may obtain route data from a route database, such as a track database.

The control system may include an input device 208 and an output device 210. Specifically, the input device may be an interface between an operator and the one or more processors. The input device may include a display or touch screen, input buttons, ports for receiving memory devices, etc. In this manner, an operator may manually provide parameters into the controller, including vehicle parameters, route parameters, and trip parameters.

The output device may present information and data to an operator or provide prompts for information and data. The output device may similarly be a display or touch screen. In this manner, a display or touch screen may be an input device and an output device.

The vehicle system may include one or more sensors 212. In one example, at least one of the sensors is a locator device utilized to determine the location of the vehicle system. The locator device may be positioned on the vehicle system, utilize wayside devices, etc. In one example, the locator device is a GNSS receiver, such as a global positioning system (GPS) receiver that receives signals from remote sources (e.g., satellites) for use in determining locations, movements, headings, speeds, etc., of the vehicles, and can provide position data related to the vehicle system. Alternatively, the locator device may use Wi-Fi, Bluetooth-enabled beacons, near-field communication (NFC), radio frequency identification (RFID), QR code, etc. to determine locations of the vehicle system.

The control system also includes a location application 214 that includes instructions that may be utilized by the one or more processors for determining the location of the vehicle system. The location application may be stored in the memory, or the instructions associated with the location application may be stored in the memory. Alternatively, the location application may be at a remote device and in communication with the control system. The location application can include instructions that direct at least some operations of the control system.

The location application may include instructions for the control system to receive or obtain a GNSS signal for a vehicle. In one example, the GNSS signal is received by the transceiver from one or more off-board sources, such as satellites, beacons, or the like.

The location application may also direct the control system to obtain a position estimation of the vehicle system by inputting values of observable characteristics into an AI-based model and receiving the position estimation as an output from the AI-based model. The AI-based model may be a dynamic model that repeatedly changes and may update as additional information is received. In an example, the AI-based model includes variables (e.g. original vehicle location, vehicle speed, wind speed and direction, friction measurements, etc.) utilized to calculate the position of the vehicle through a mathematical equation that may add, subtract, multiply, or divide the variables to calculate the location of the vehicle. In addition, each variable has a coefficient or weight associated therewith that are utilized to attempt to reduce error in the calculation. So, when a location calculation is made, if an error exists in the calculation compared to the actual location of the vehicle, the coefficient for each variable may be varied such that in a recalculation with the variables provided, no error would be presented. The new coefficients are then utilized the next time a location to calculated utilizing a new set of values for the variables (e.g. the same variable or characteristic is measured, but it is a new measurement because the vehicle is at a new location). The error for this new set of values can then again be utilized to adjust the coefficients until the error in the calculation no longer exists or is negligible.

In making the location calculation, the variables may include observable characteristics such as inertial measurements of the vehicle. The inertial measurement may include roll, pitch, yawn, etc. In one example, the observable characteristics may include one or more of route information, inertial measurements of the vehicle, environmental data, wheel information of the vehicle, etc. In one embodiment, the route information may indicate layouts of one or more routes. The layouts of the one or more routes may be input into the AI-based model as location constraints on potential locations of the vehicle. The environmental data may include ambient temperature, ambient pressure, ambient humidity, weather, or the like. Wheel information may include wheel size, rotational speed, diameter, wear, etc.

When making the error calculation, the calculation may be a comparison between the position estimation and the location that is derived, a mathematical formula related to the comparison, a mathematical model, or the like. Then, based on the error calculated, the coefficients applied to each variable (e.g. the observable characteristics) in the AI-based model may be changed. For example, if the model gives a fifty percent coefficient to a location on a route, forty percent coefficient to inertial measurements and ten percent coefficient to environment data and a twenty percent error is provided, then during the next calculation, sixty percent coefficient may be provided to a location on a route, while thirty percent coefficient is provided to inertial measurements and ten percent coefficient to environmental data. Then, if the calculated error is reduced to fifteen percent, the coefficients may be changed again, this time providing seventy percent coefficient to location on a route, and twenty percent coefficient to inertial measurements and ten percent coefficient to environmental data. If the calculated error reduces again, the weights may be changed similarly; however, if the calculated error increased, then the coefficient may be varied in a different manner. After numerous iterations, the calculated error is reduced and approaches zero. While in this example three variables (e.g. observable characteristics) are provided, in other examples ten, twenty, or more observable characteristics could be utilized to make the determination. To this end, the location application may continuously determine a model-based location of the vehicle from the position estimation of the AI-based model subsequent to changing the one or more of the coefficients in the AI-based model. As the number of determinations increases, the error decreases accordingly. By utilizing this methodology, when the GNSS signal is not available, the model-based location of the vehicle may be utilized. To this end, because the error is reduced, the AI-based model becomes a dependable method for determining the location of a vehicle, even when the GNSS cannot be determined.

The location application may also change the movement of the vehicle based on the determined model-based location. In one example, after a threshold number of iterations the location application may start utilizing the determined model-based location instead of the GNSS signal location. In one example, the vehicle may be an autonomous vehicle that changes movement of the vehicle itself based on the determined model-based location such that GNSS signal location is not required for movement. In one example, in a location where GNSS signal strength is low, while going through a tunnel, or other location where the signal may typically be blocked, or otherwise, the control system can operate the vehicle based solely on the determined model-based location. Once the vehicle is no longer in the determined area, the control system may switch back to utilizing the GNSS signal location.

The location application may also calculate an uncertainty in the location derived from the GNSS signal based on the error that is calculated. In particular, after numerous iterations utilizing the AI-based model, the error should consistently be below a threshold error rate at all times. Thus, if the error exceeds the threshold, the certainty of the GNSS signal location may be decreased. For example, if the percent error of the last ten iterations are 2%, 3%, 1%, 1.5%, 1%, 1%, 0.5% 2%, 1%, and 0%, the threshold error amount may be 5%, such that if the eleventh iteration is suddenly 15%, the location application may determine that the GNSS signal has decreased reliability.

The location application may also calculate one or more changes to the one or more of the weights or coefficients applied to the observable characteristics in the AI-based model by inputting the uncertainty in the location to an unscented Kalman filter. In another example, other numerical methodologies may be utilized to determine the uncertainty. Still, by using the unscented Kalman filter, an uncertainty can be provided to the control system, and operator, etc. for use when making determinations related to operating and changing movements of the vehicle.

Figure 3:
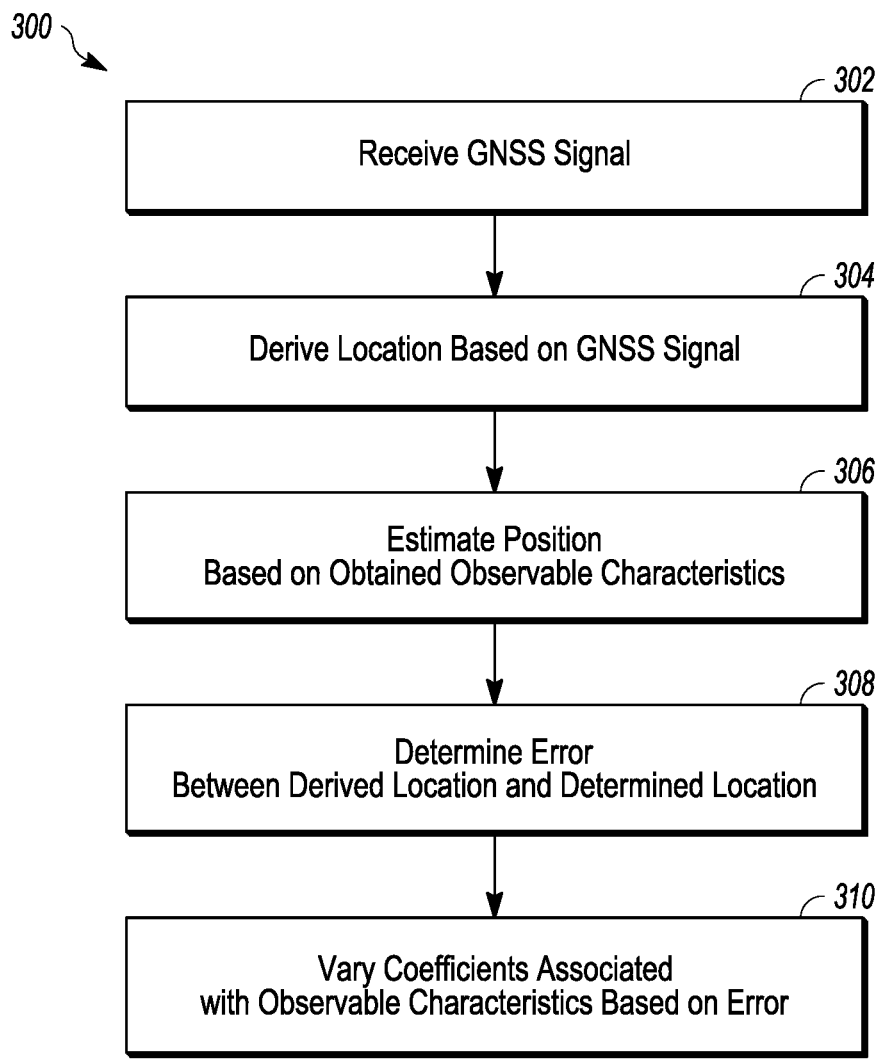
FIG. 3 illustrates schematic flow block diagram of a process for determining the location of a moving vehicle.

FIG. 3 illustrates a schematic flow block diagram for determining the location of a vehicle 300. In one example, the control system of FIGS. 1-2 perform are utilized to perform the method. In one example, the location application of FIG. 2 provides instructions that may be utilized by one or more processors for implementing the process.

At step 302, a GNSS signal is received by a moving vehicle. In one example the moving vehicle is a rail vehicle. In another example, the moving vehicle may be an automobile, off-road vehicle, trolley, mining vehicle, tractor, excavator, ship, airplane, or the like. In one example the GNSS signal may be a GPS signal.

At step 304, a location of the moving vehicle is derived based on the GNSS signal. By receiving the GNSS signal the location of the moving vehicle may be determined.

At step 306, an estimated position of the vehicle is determined utilizing obtained observable characteristics (e.g. variables) in the AI-based model. Observable characteristics may include inertial measurements, environmental data, route data, route layout data, route information, inertial data, environmental measurements, wheel data, wheel based measurements, engine data, engine based measurements, operator commands, movement restrictions, braking data, braking measurements, or the like. Each observable characteristic may be data, information, measurements, etc. of operating systems, environmental conditions, operating conditions, etc. that may be utilized to determine the position or location of the moving vehicle. Such observable characteristics may not have a direct bearing on the location calculation, but instead may be related or vary an observable characteristic that does have a direct bearing on the location calculation. For example, braking wear may not have a direct bearing on the location calculation; however, if a vehicle is suddenly braked, causing potential changes in the location calculation, the braking wear does affect the efficiency of the braking that can affect a location calculation. In this manner, the braking wear is an observable characteristic.

At step 308, an error is determined between the derived location and the position estimated. The AI-based model is initially utilized to make a position estimation utilizing each of the observable characteristics (e.g. variables). A coefficient (e.g. amount of weight) is associated with each observable characteristic (e.g. variable) used to calculate the position estimated to account for measurement errors. For each iteration of making the position estimation, the coefficients (e.g. weights) may be changed and the error between the position estimated and location derived from the GNSS signal determined. Then, based on the error, the coefficients may be varied. If coefficients are varied and an error is reduced, the AI-model determines the change of coefficients was "correct", or a reward is provided, and the coefficients are again varied similarly. However, if the error increases, then a determination is made that the changing of the coefficient(s) was "incorrect" and the coefficients are again changed accordingly, with the AI-based model desiring to receive as many "correct" changes (e.g. rewards) as possible.

At step 310, the coefficient of at least one observable characteristic is varied based on the error. In one example the coefficients may be expressed in percentages. In another example, during an initial iteration, or determination of the location, each observable characteristic may be provided an identical coefficient. Alternatively, a location application may have pre-determined coefficients that are provided to each observable characteristic for a first iteration. Once the error is determined, then the changing of the coefficients may be made based on the comparison of the error between the position estimated and the position derived from the GNSS signal during a first iteration and the error between the position estimated and the position derived from the GNSS signal during the second iteration. To this end, as additional iterations occur, all previous errors determined may be reviewed or utilized to determine how the coefficients of the observable characteristics are to be changed. In this manner, a continuous loop is provided with each position estimated resulting in a new error allowing for the coefficients in the next calculation of a position estimated to be changed.

After numerous iterations, error is consequently reduced until the location derived from the GNSS signal is identical, or nearly identical to the position estimated based on the AI-based model. Once this occurs, or the position estimation is less than a threshold amount of error for a determined number of iterations, that position estimated may then be utilized to locate the vehicle. In this manner, the position estimation may be utilized so that when the GNSS signal is unavailable, such as a result of going through a tunnel, being in a location with reduced coverage, etc., the location of the moving vehicle can still be determined. To this end, if the vehicle is being autonomously operated, the position estimation may be utilized to change the movement of the vehicle itself instead of utilizing the GNSS signal.

Figure 4:
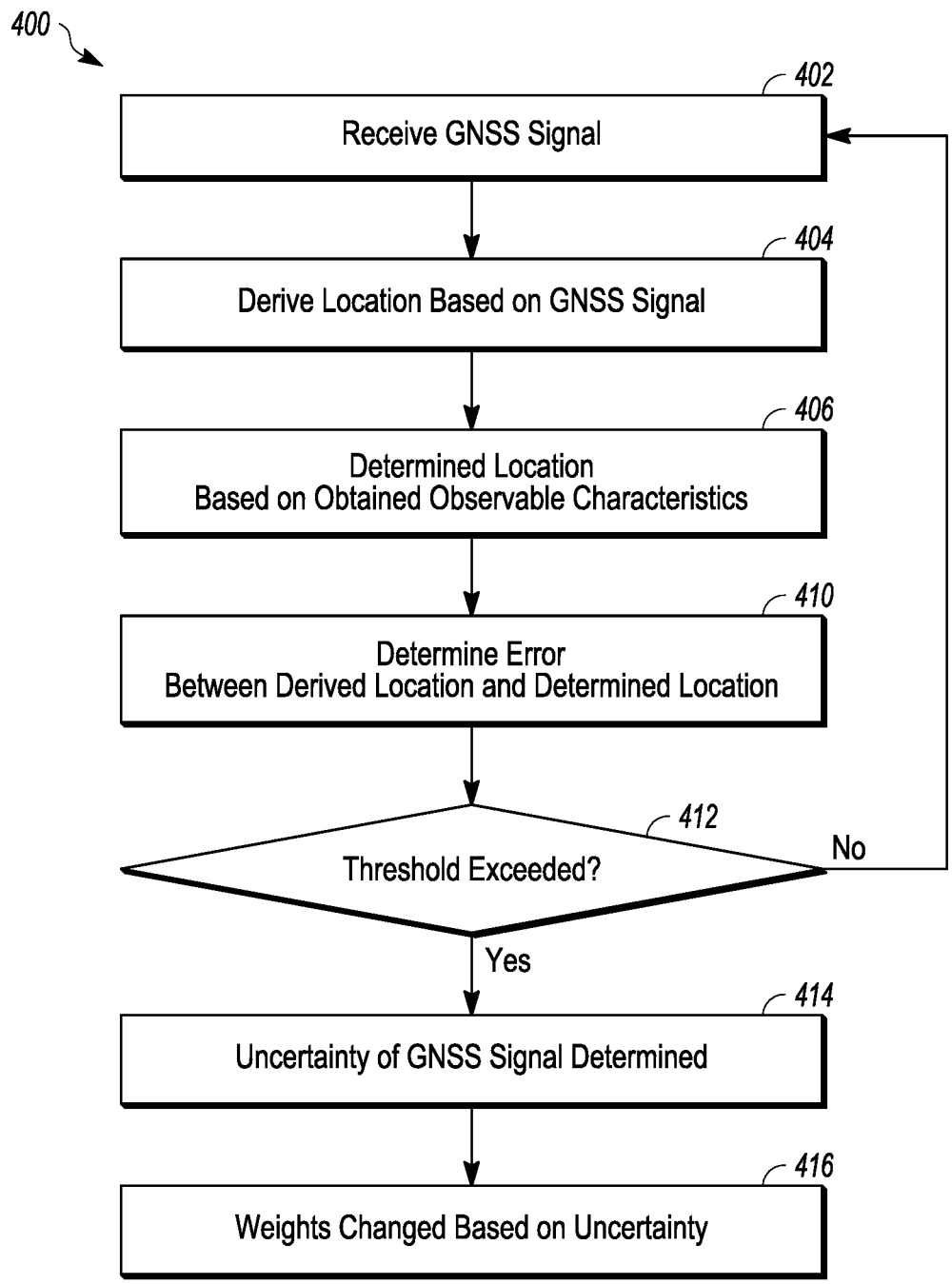
FIG. 4 illustrates a schematic flow block diagram for a process for determining uncertainty in a GNSS signal.

FIG. 4 illustrates a schematic flow block diagram for determining the uncertainty of a GNSS signal 400. In one example the control systems of either FIG. 1 or 2 are utilized to perform the process. In another example, the process may be performed while also performing the process provided in FIG. 3.

At step 402, a GNSS signal is received by a moving vehicle. In one example the step is undertaken in the same manner as step 302 of FIG. 3. At step 404, a location of the moving vehicle may be derived based on the GNSS signal. In an example, the step is undertaken in the same manner as step 304 of FIG. 3. At step 406, observable characteristics are obtained for use in the AI-based model and a location or position estimation may be determined. In one example, the step is undertaken in the same manner as step 306 of FIG. 3. In one example, the AI-based model provides or assigns coefficients to the different observable characteristics to determine the position estimation. Then the AI-based model continuously changes the coefficients to determine the coefficients that provide the least amount of error between the position estimation and the location of the moving vehicle derived based on the GNSS signal. In this manner, the uncertainty is estimated based on navigation data. In one example, a combination of the AI-based model and the unscented Kalman filter may be utilized to make the estimation of the uncertainty based on the navigation data.

At step 410, an error may be calculated between the location derived from the GNSS signal and the position estimation obtained from the AI-based model that includes use of the unscented Kalman filter. The error may be calculated based on a determination of the distance between the location derived from the GNSS signal and the position estimation obtained from the AI-based model and unscented Kalman filter. The greater the distance between the location and position estimation, the greater the error in the AI-based model and unscented Kalman filter. In one example, an assumption may be made that the GNSS signal provides the correction location of the vehicle system, where the position estimation of the AI-based model and unscented Kalman filter is incorrect, and as a result, all error is the result of the AI-based model and unscented Kalman filter and inaccurate coefficients being provided.

Optionally, at step 412, a determination may be made whether a threshold error has been exceeded. In particular, after a significant number of iterations of determining the coefficients to be provided to the observable characteristics, the error between the location derived from the GNSS signal and the position estimation obtained from the AI-based model and unscented Kalman filter should approach zero. As a result, the AI-based model and unscented Kalman filter can then become a check on the GNSS signal. So once the error rate is below a threshold value such as 5% a determined number of consecutive iterations, such as five, ten, fifteen, etc., if the threshold value is exceeded, an indication may be provided that the location derived from utilizing the GNSS signal may be incorrect.

If at step 412, a threshold error has not been exceeded, then no additional action is undertaken. However, if at step 412 the threshold error is exceeded, then at step 414 an uncertainty in the location derived from the GNSS signal based on the error is calculated. While in one example, the determination of the threshold error may be a prerequisite of determining the uncertainty, in another example, the uncertainty is continuously determined based on the fluctuation in the error. Importantly, when the GNSS signal provides an error, the coefficients may be changed based on faulty information, causing greater error in future iterations.

At step 416, coefficients applied to the observable characteristics in the AI-based model and unscented Kalman filter are changed based on the uncertainty provided. In particular, if the error determined appears to be an anomaly and inconsistent with previous errors, the amount of weight provided to the error may be decreased to prevent improperly changing coefficients. In one example, a fuzzy inference system may be utilized for identification of the uncertainties in an estimation of the position, and the unscented Kalman filter may be utilized for determining the coefficients based on the uncertainty of the error. Thus, the AI-based model and unscented Kalman filter can be utilized for operating the vehicle and checking to ensure that location data obtained, determined, calculated, etc. is accurate for operating the moving vehicle.

In one or more embodiments, a method is provided that may include receiving a global navigation satellite system (GNSS) signal for a moving vehicle and obtaining a position estimation of the vehicle by inputting values of observable characteristics into an artificial intelligence (AI)-based model and receiving the position estimation as an output from the AI-based model. The AI-based model applies different coefficients to the values of the observable characteristics to output the position estimation. The method may also include calculating an error between a location derived from the GNSS signal that may be received and the position estimation obtained from the AI-based model, and changing one or more of the coefficients applied to the observable characteristics in the AI-based model based on the error that is calculated.

Optionally, the method may also include determining a model-based location of the vehicle from the position estimation of the AI-based model subsequent to changing the one or more of the coefficients in the AI-based model. In one aspect, the model-based location of the vehicle is determined from the AI-based model while the GNSS signal is unavailable. In another aspect, the method may also include changing movement of the vehicle using the model-based location that is determined. In one example, the method may include calculating an uncertainty in the location derived from the GNSS signal based on the error that is calculated and calculating one or more changes to the one or more of the coefficients applied to the observable characteristics in the AI-based model by inputting the uncertainty in the location to an unscented Kalman filter. In yet another example, the observable characteristics that are input into the AI-based model can include one or more of route information, inertial measurements of the vehicle, environmental data, or wheel information of the vehicle.

Optionally, the observable characteristics that are input into the AI-based model include the route information, and the route information may indicate layouts of one or more routes. In one aspect, the layouts of the one or more routes may be input into the AI-based model as location constraints on potential locations of the vehicle. In another aspect, the observable characteristics that are input into the AI-based model may include the inertial measurements of the vehicle. In one example, the observable characteristics that are input into the AI-based model may include the environmental data. Optionally, the environmental data can include an ambient temperature. In another example, the observable characteristics that are input into the AI-based model may include the wheel information. Optionally, wheel information can include one or more of a wheel size or a rotational speed of a wheel of the vehicle.

In one or more embodiments, a system may be provided that includes a controller that may receive a global navigation satellite system (GNSS) signal for a moving vehicle. The controller may determine a position estimation of the vehicle by inputting values of observable characteristics into an artificial intelligence (AI)-based model and receiving the position estimation as an output from the AI-based model. The AI-based model may apply different coefficients to the values of the observable characteristics to output the position estimation. The controller may also calculate an error between a location derived from the GNSS signal that is received and the position estimation obtained from the AI-based model, and to change one or more of the coefficients applied to the observable characteristics in the AI-based model based on the error that is calculated.

Optionally, the controller may also determine a model-based location of the vehicle from the position estimation of the AI-based model subsequent to changing the one or more of the coefficients in the AI-based model. In one aspect, the controller may determine the model-based location of the vehicle from the AI-based model while the GNSS signal is unavailable. In another aspect, the controller may change movement of the vehicle using the model-based location that is determined. In one example, the controller may also calculate an uncertainty in the location derived from the GNSS signal based on the error that is calculated and may also calculate one or more changes to the one or more of the coefficients applied to the observable characteristics in the AI-based model by inputting the uncertainty in the location to an unscented Kalman filter. In another example, the controller may input one or more of route information, inertial measurements of the vehicle, environmental data, or wheel information of the vehicle into the AI-based model as the observable characteristics. In yet another example, the controller may input the route information into the AI-based model as at least part of the observable characteristics, the route information indicating layouts of one or more routes.

Optionally, the controller may input the layouts of the one or more routes into the AI-based model as location constraints on potential locations of the vehicle. In another embodiment, the controller may input inertial measurements of the vehicle into the AI-based model as at least part of the observable characteristics. In one aspect, the controller may input the environmental data into the AI-based model as at least part of the observable characteristics. In another aspect, the environmental data can include an ambient temperature. In one example, the controller may also input the wheel information into the AI-based model as at least part of the observable characteristics. In another example, the wheel information may include one or more of a wheel size or a rotational speed of a wheel of the vehicle.

In one or more embodiments a method is provided that may include receiving a global navigation satellite system (GNSS) signal for a moving vehicle, and obtaining a position estimation of the vehicle by inputting values of observable characteristics into an artificial intelligence (AI)-based model and receiving the position estimation as an output from the AI-based model. The AI-based model can apply different coefficients to the values of the observable characteristics to output the position estimation. The method may also include calculating an error between a location derived from the GNSS signal that is received and the position estimation obtained from the AI-based model, and calculating an uncertainty in the location derived from the GNSS signal based on the error that is calculated. The method may also include calculating one or more changes to the one or more of the coefficients applied to the observable characteristics in the AI-based model by inputting the uncertainty in the location to an unscented Kalman filter. Optionally, the observable characteristics that are input into the AI-based model can include route information, inertial measurements of the vehicle, environmental data, and wheel information of the vehicle.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A method comprising:
   receiving a global navigation satellite system (GNSS) signal for a moving vehicle;
   obtaining a position estimation of the vehicle by inputting values of observable characteristics into an artificial intelligence (AI)-based model and receiving the position estimation as an output from the AI-based model, the AI-based model applying different coefficients to the values of the observable characteristics to output the position estimation;
   calculating an error between a location derived from the GNSS signal that is received and the position estimation obtained from the AI-based model; and
   changing one or more of the coefficients applied to the observable characteristics in the AI-based model based on the error that is calculated.

2. The method of claim 1, further comprising:
   determining a model-based location of the vehicle from the position estimation of the AI-based model subsequent to changing the one or more of the coefficients in the AI-based model.

3. The method of claim 2, wherein the model-based location of the vehicle is determined from the AI-based model while the GNSS signal is unavailable.

4. The method of claim 2, further comprising:
   changing movement of the vehicle using the model-based location that is determined.

5. The method of claim 1, further comprising:
   calculating an uncertainty in the location derived from the GNSS signal based on the error that is calculated; and
   calculating one or more changes to the one or more of the coefficients applied to the observable characteristics in the AI-based model by inputting the uncertainty in the location to an unscented Kalman filter.

6. The method of claim 1, wherein the observable characteristics that are input into the AI-based model include one or more of route information, inertial measurements of the vehicle, environmental data, or wheel information of the vehicle.

7. A system comprising:
   a controller configured to receive a global navigation satellite system (GNSS) signal for a moving vehicle, the controller configured to determine a position estimation of the vehicle by inputting values of observable characteristics into an artificial intelligence (AI)-based model and receiving the position estimation as an output from the AI-based model, the AI-based model applying different coefficients to the values of the observable characteristics to output the position estimation,
   the controller configured to calculate an error between a location derived from the GNSS signal that is received and the position estimation obtained from the AI-based model, and to change one or more of the coefficients applied to the observable characteristics in the AI-based model based on the error that is calculated.

8. The system of claim 7, wherein the controller is configured to determine a model-based location of the vehicle from the position estimation of the AI-based model subsequent to changing the one or more of the coefficients in the AI-based model.

9. The system of claim 8, wherein the controller is configured to determine the model-based location of the vehicle from the AI-based model while the GNSS signal is unavailable.

10. The system of claim 8, wherein the controller is configured to change movement of the vehicle using the model-based location that is determined.

11. The system of claim 7, wherein the controller is configured to calculate an uncertainty in the location derived from the GNSS signal based on the error that is calculated, and to calculate one or more changes to the one or more of the coefficients applied to the observable characteristics in the AI-based model by inputting the uncertainty in the location to an unscented Kalman filter.

12. The system of claim 7, wherein the controller is configured to input one or more of route information, inertial measurements of the vehicle, environmental data, or wheel information of the vehicle into the AI-based model as the observable characteristics.

13. The system of claim 12, wherein the controller is configured to input the route information into the AI-based model as at least part of the observable characteristics, the route information indicating layouts of one or more routes.

14. The system of claim 13, wherein the controller is configured to input the layouts of the one or more routes into the AI-based model as location constraints on potential locations of the vehicle.

15. The system of claim 12, wherein the controller is configured to input inertial measurements of the vehicle into the AI-based model as at least part of the observable characteristics.

16. The system of claim 12, wherein the controller is configured to input the environmental data into the AI-based model as at least part of the observable characteristics.

17. The system of claim 12, wherein the controller is configured to input the wheel information into the AI-based model as at least part of the observable characteristics.

18. The system of claim 17, wherein the wheel information includes one or more of a wheel size or a rotational speed of a wheel of the vehicle.

19. A method comprising:
    receiving a global navigation satellite system (GNSS) signal for a moving vehicle;
    obtaining a position estimation of the vehicle by inputting values of observable characteristics into an artificial intelligence (AI)-based model and receiving the position estimation as an output from the AI-based model, the AI-based model applying different coefficients to the values of the observable characteristics to output the position estimation;
    calculating an error between a location derived from the GNSS signal that is received and the position estimation obtained from the AI-based model;
    calculating an uncertainty in the location derived from the GNSS signal based on the error that is calculated; and
    calculating one or more changes to the one or more of the coefficients applied to the observable characteristics in the AI-based model by inputting the uncertainty in the location to an unscented Kalman filter.

20. The method of claim 19, wherein the observable characteristics that are input into the AI-based model include route information, inertial measurements of the vehicle, environmental data, and wheel information of the vehicle.

\* \* \* \* \*